Feb. 6, 1968  J. H. SCOTT  3,367,210
BEATERS AND MIXERS
Filed Oct. 7, 1965
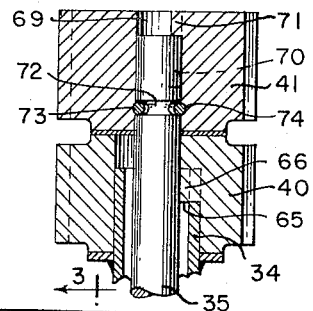
FIG__4
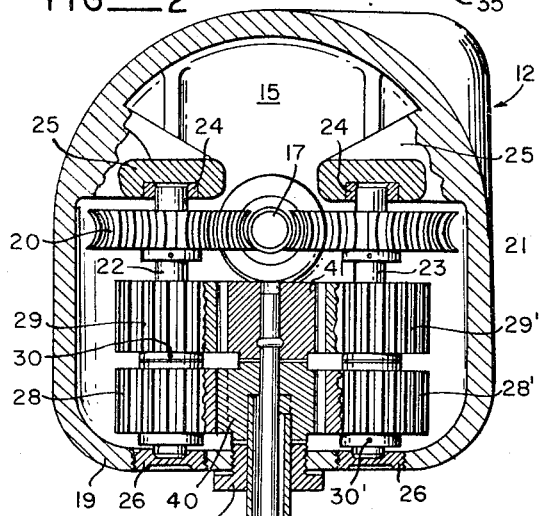
FIG__2
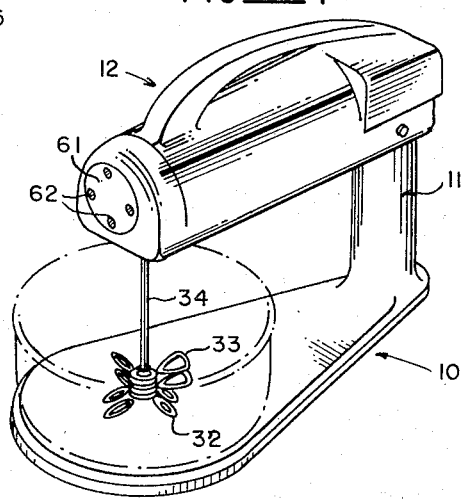
FIG__1
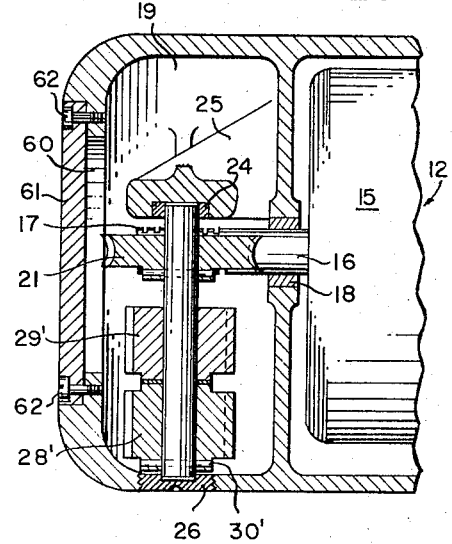
FIG__3
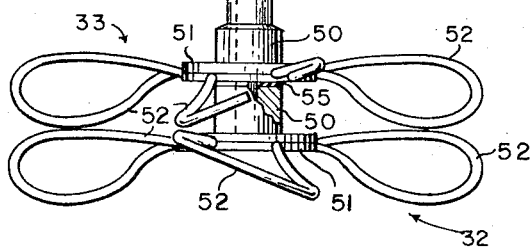
FIG__5
JOHN H. SCOTT
INVENTOR.
BY *Seed & Berry*
ATTORNEYS

United States Patent Office 3,367,210
Patented Feb. 6, 1968

3,367,210
BEATERS AND MIXERS
John H. Scott, 847 NE. 88th, Seattle, Wash. 98115
Filed Oct. 7, 1965, Ser. No. 493,660
2 Claims. (Cl. 74—665)

This invention relates to improvements in beaters and mixers, and it has reference more particularly to the provision of coacting, dual beaters or mixing heads, arranged for rotation in opposite directions in close relationship on coaxially assembled driving shafts.

It is the principal object of the present invention to provide an improved form of electrically driven beater and mixer, for general kitchen uses or in commercial bakeries, which is exceptionally efficient and effective in its bearing and mixing actions; which is light in weight; easy to handle and characterized by the novel use and arrangement of dual beater heads operating cooperatively in opposite directions about a common axis.

It is a further object of the present invention to provide a novel arrangement of driving gears for the two beater head driving shafts, that is long wearing, relatively noiseless and which is balanced in the application of power to the two beater shafts.

Another object of the invention is to provide for the quick and easy removal of the beaters for easy cleaning; and to provide for their easy and ready application for use. Also to provide effective, releasable driving connections between the beater shafts and their respective driving gears. Furthermore, to provide a single holding element for retaining both shafts operatively connected with their driving gears.

Still further objects of the invention reside in the details of construction and combination of parts, and in their mode of operation and use, as will hereinafter be fully described.

In accomplishing these and other objects of the invention, I have provided the improved details of construction, the preferred forms of which are illustrated in the accompanying drawings, wherein:

FIG. 1 is a perspective view showing an electrically driven mixer, or beater, embodying the improvements of the present invention therein.

FIG. 2 is an enlarged sectional view, taken through the gear box of the device, and showing the coaxial arrangement of the beater shafts and their driving shafts.

FIG. 3 is a vertical section through the gear box, taken substantially on the line 3—3 in FIG. 2.

FIG. 4 is an enlarged sectional detail, showing the means for and manner of effecting driving connections between the beater drive shafts in their driving gears.

FIG. 5 illustrates a modified form of dual beaters mounted on independent, counter-rotating shafts.

Referring more in detail to the drawings:

In the present drawings, I have shown the improvements of the present invention as applied to a typical form of electrically driven beater. The beater is shown in FIG. 1 to comprise a base portion 10, on one end of which is an upright pedestal or post 11, to the upper end of which post a motor and gear housing, designated in its entirety by numeral 12, is pivotally mounted for adjustment from the substantially horizontal position in which it is shown in FIG. 1, to an upwardly inclined position.

The beater elements are adapted to be driven by an electric motor 15 contained, as shown in FIG. 3, within the housing 12. The motor has a drive shaft 16 formed at its end with a worm 17 for driving the two sets of beater shaft driving gears. It is further shown in FIG. 3 that the motor shaft 16 extends through a supporting bearing 18 in a partition wall of the housing into a gear box 19, which is formed as an integral the housing 12. The worm 17 extends horizontally and is positioned between the two worm gears, 20 and 21, and in operative mesh with each of them, as has been shown in FIG. 2.

The worm gears 20 and 21 are fixed, respectively, on the upper end portions of vertically disposed, parallel shafts 22 and 23 that are rotatably supported in the gear box 19; each shaft having its upper end portion rotatably contained in a bearing 24 set in a lug 25 formed on the enclosing walls of the gear box. The lower ends of the shafts 22 and 23 are revolvably contained in bearings 26 that are threaded upwardly into the bottom wall of the gear box. The bearings 26 are socketed to receive the lower ends of the shaft as shown in FIG. 2.

Mounted on the shaft 22, one directly above the other, are two gear wheels 28 and 29 of like size. Likewise mounted on shaft 23, are gear wheels 28' and 29' of the same size. The upper gear 29 at the left hand side, as shown in FIG. 2, is fixed to its mounting shaft by a pin 30 through its hub portion, while the lower gear wheel 28 is freely rotatable on the shafts. Also, the lower gear wheel 28' at the right hand side in FIG. 2 is fixed to its shaft by a pin 30' while the upper gear 29' is free for rotation thereon.

The beater heads as illustrated in FIG. 2 and designated herein as the lower head 32 and upper head 33, are mounted for coaxial rotation. The upper head 33 is fixed on the lower end of a tubular shaft 34. The lower beater head 32, likewise, is fixed on the lower end of a solid shaft 35 that extends coaxially of and is freely rotatable within shaft 34. At their upper ends both shafts extend through a bearing 36 that is threaded upwardly into the bottom wall of the gear box 19. The shafts 34 and 35 are parallel to and midway between the shafts 22 and 23. At its upper end the shaft 34 terminates in and has a driving connection with a gear wheel 40 that is located between and in mesh with the gear wheels 28 and 28'. The shaft 35 extends from the upper end of tubular shaft 34 and this has a driving connection with a gear wheel 41 that is located between and in driving mesh with the two gear wheels 29 and 29'.

It will be understood that, by this arrangement of gears, as driven by the worm 17 on the motor 16, the beater shafts 34 and 35 will be driven at the same speed but in opposite directions. Gear wheels 28, 28', 29, 29', 40 and 41 are still all of the same size and rotate in unison. The two gear wheels 28 and 29' that run free on their mounting shafts are employed merely to balance the driving gears which mesh, respectively, with the gear wheels 40 and 41.

The beater heads 32 and 33 as shown in FIG. 2 comprise a hub portion 50 with an extending peripheral flange 51 at its lower end. A plurality of beater loops 52 extend radially to equal extent from the respective flanges 51. Each of the beater loops comprises a single length of stiff wire which is bent to loop form, and the opposite ends of each loop are secured in the hub flange as shown. The looped portions are inclined at an angle of about 30° as best shown by the end view of loops in FIG. 2 wherein it will be noted that the loops of the upper beater are inclined in one direction while those of the lower beater are inclined in an opposite direction. With the loop beater elements so arranged and with the heads located closely together and rotating in opposite directions, with slight clearance, the beating and mixing is most effective and efficient.

The joint between the beater heads is sealed, as seen in FIG. 2, by a gasket 55 to prevent liquid working its way upwardly through the tubular shaft.

In FIG. 5 I have illustrated an alternative heater construction. In the alternative form, the beater elements 80 and 81 are mounted in fixed position on the lower ends of shafts 82 and 83. Shaft 82 is tubular and shaft 83 is a solid rod rotatably contained within shaft 82. The shafts are secured to gears 40 and 41 in the same manner as illustrated in FIGS. 2 and 4. In the beater 80, I provide bearings 84 and 85. The lower end of the shaft 83 is journaled in bearing 84. A stub shaft 87 is provided on the lower end of beater 81 and the stub shaft is journaled in bearing 85. The beater 81 rotates within the loop of the beater 80 with slight clearance therebetween.

Access to the gear case is provided for through an end opening 60, normally closed by an end plate 61 held by screws 62 as seen in FIG. 1.

The means for effecting driving connections between the upper ends of shafts 34 and 35 with the gears 40 and 41 is best shown in FIG. 4 wherein it is observed that the gear 40 has an axial bore therethrough designed to contain the upper end portion of shaft 34 therein. The upper end of this tubular shaft is notched as at 65 in FIG. 4 to receive a lug 66 projecting into the upper end of the bore from a side wall thereof.

Likewise, the gear 41 is formed with an axial bore 69 designed to contain the upper end portion of shaft 35 therein. This shaft is formed at its upper end with a longitudinal notch or keyway 70 designed to receive a lug 71 projecting from a wall of the bore. The driving connections are effected merely by pushing the upper ends of the shaft upwardly into the gear bores and seating the lugs in the end notches of the shafts.

To hold the shafts in place, the shaft 35 is formed near its upper end with an encircling channel 72 in which a snap ring 73 is fitted and which is adapted to expand into a channel 74 formed in the bore 69 of gear 41 thus to effect a yieldable holding connection.

Downward pull on head 32 will unseat the snap ring from channel 74 and allow the removal of the beater elements from connection with the gear case.

What I claim as new is:

1. Driving gearing for a pair of coaxially arranged beater shafts; said gearing comprising paired pinion gears of equal diameter in coaxial alignment and equipped for receiving the inner ends of coaxial beater shafts therein, respectively, for driving said shafts, counter shafts mounted parallel with and at opposite sides of the axially aligned paired pinion gears, paired drive gears of equal diameter fixed on said counter shafts, respectively, a driven gear common to and in driving mesh with said drive gears for driving said drive gears and said counter shafts in unison in opposite directions, gear wheels of the same diameter fixed on said counter shafts in driving mesh with said paired pinion gears, respectively, to cause driving of the beater shafts applied thereto in unison, in opposite directions and paired idler gear wheels, freely rotatable on said counter shafts respectively, and meshing, respectively, with the pinion gears in pressure balancing relationship to their drive gears.

2. Driving gearing as recited in claim 1 wherein said paired pinion gears are axially bored to respectively receive the upper ends of said beater shafts therein, in a driving connection, and said connections are both yieldingly retained by means associated with one gear.

References Cited

UNITED STATES PATENTS

| | | | |
|---|---|---|---|
| 216,099 | 6/1879 | Mortensen | 74—425 |
| 500,839 | 7/1893 | Anthony | 74—665 |
| 625,003 | 5/1899 | Whiting | 74—665 |
| 2,505,435 | 4/1950 | Schmidt | 74—425 X |
| 2,552,023 | 5/1951 | Andersen | 64—4 X |
| 2,567,293 | 9/1951 | Maxwell | 74—425 X |
| 2,625,218 | 1/1953 | Nihon | 74—425 X |
| 3,012,448 | 12/1961 | Abraham | 74—425 X |

ROBERT A. O'LEARY, *Primary Examiner.*

DONLEY J. STOCKING, *Examiner.*

J. R. BENEFIEL, *Assistant Examiner.*